Jan. 16, 1968 H. PFEIFFER 3,363,743
METHOD AND APPARATUS FOR TRANSPORTING TUBULAR ARTICLES
Filed Aug. 24, 1964 6 Sheets-Sheet 1
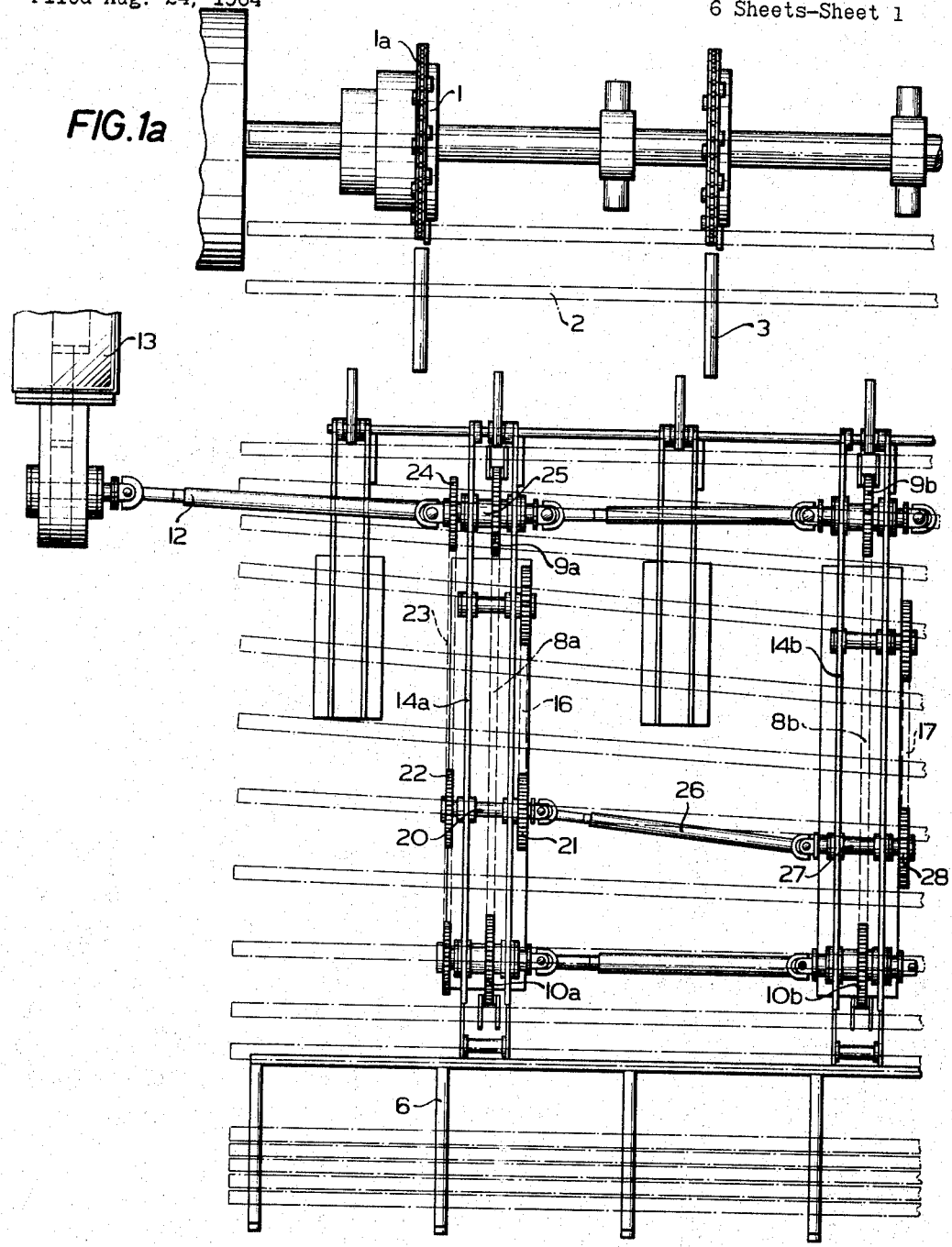
INVENTOR
Hans PFEIFFER
By
*Michael S. Striker*
his ATTORNEY

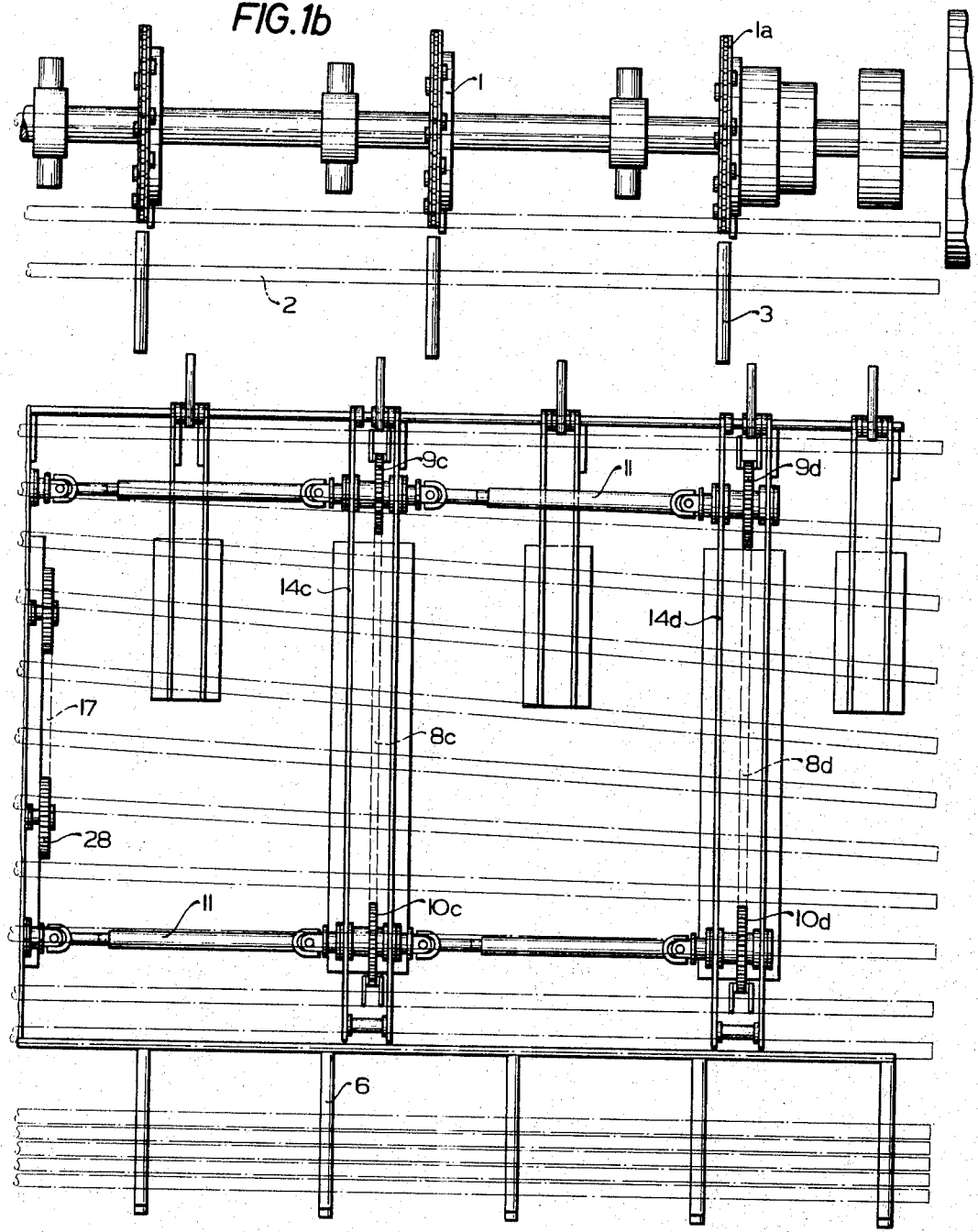

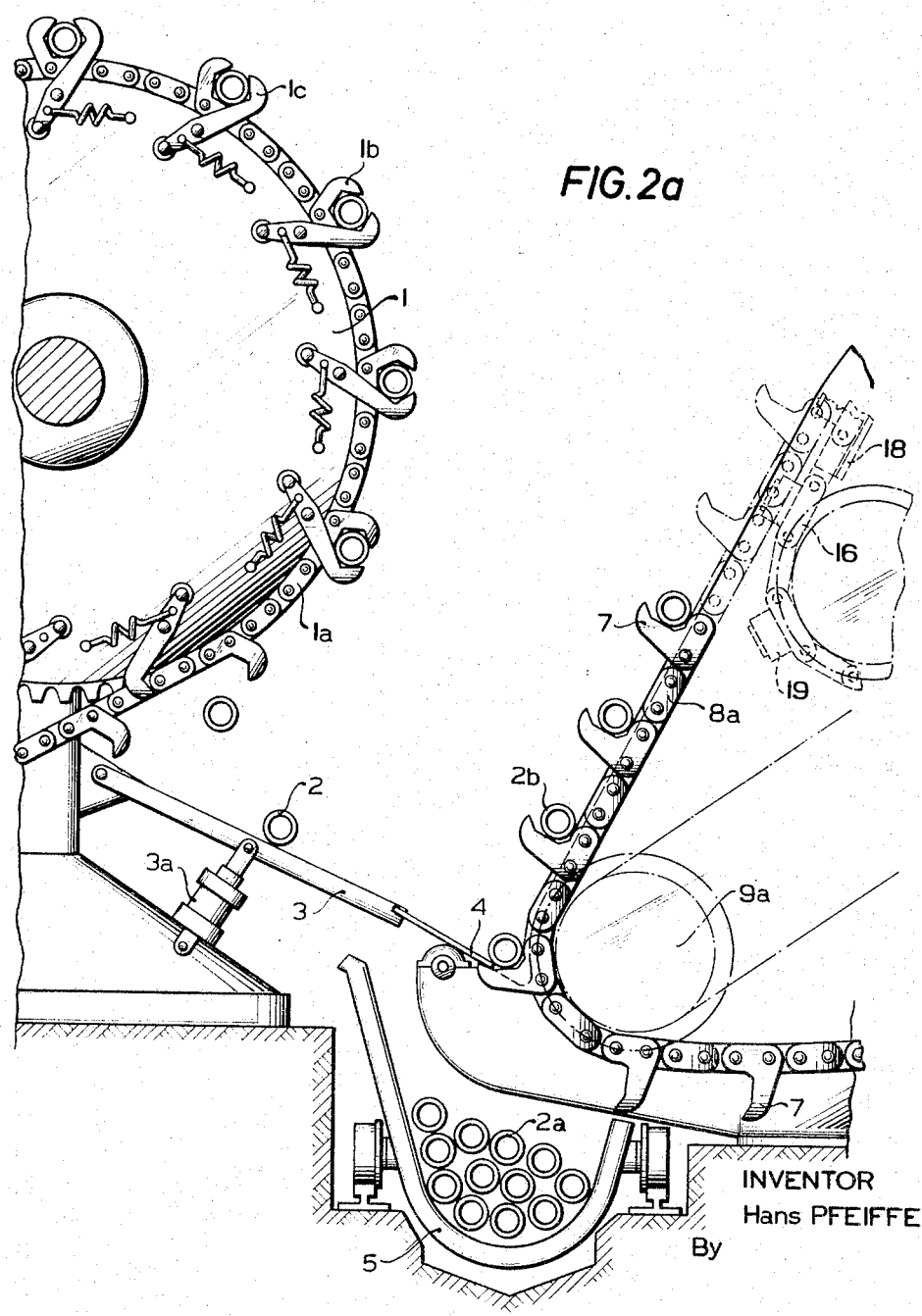

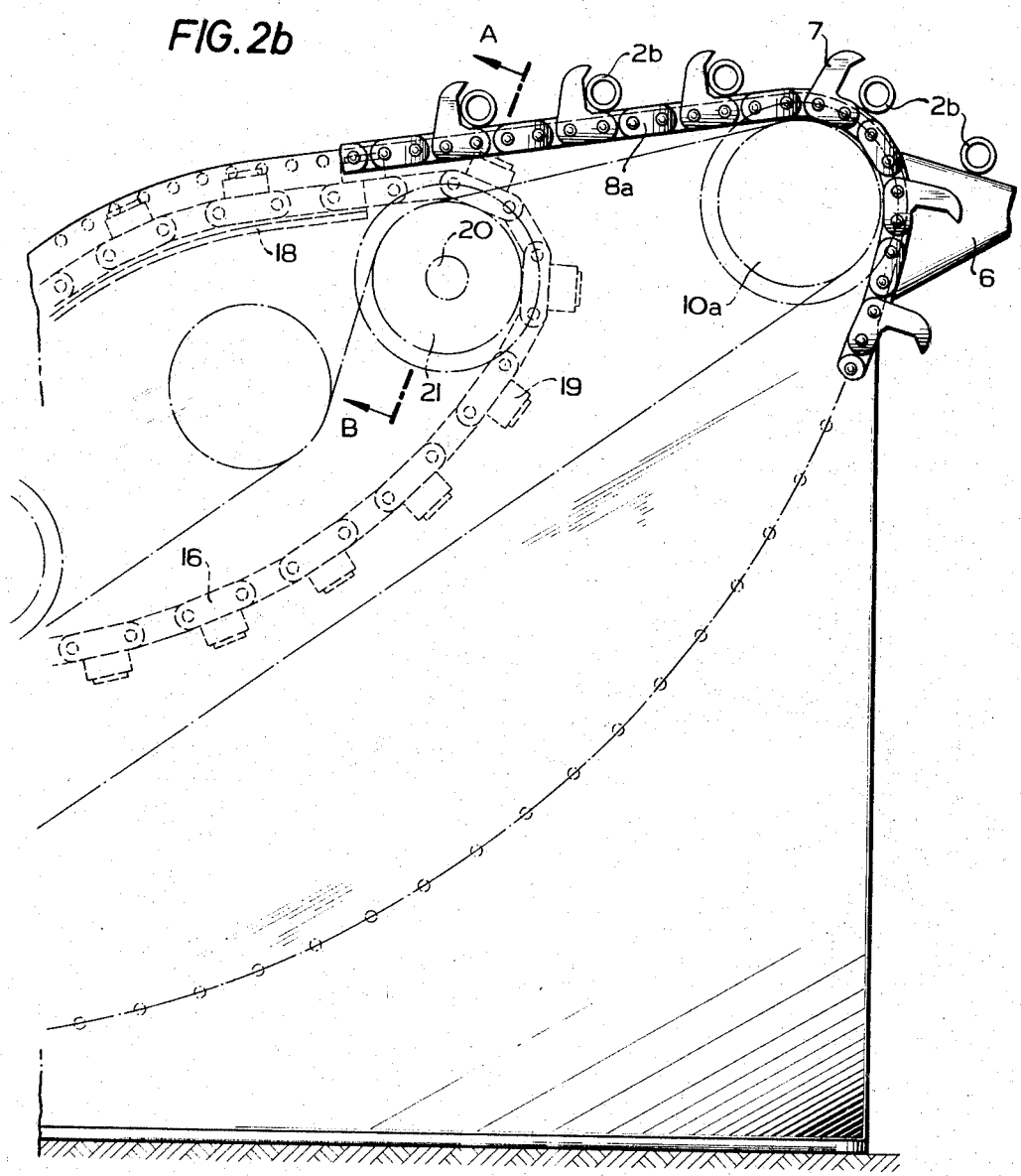

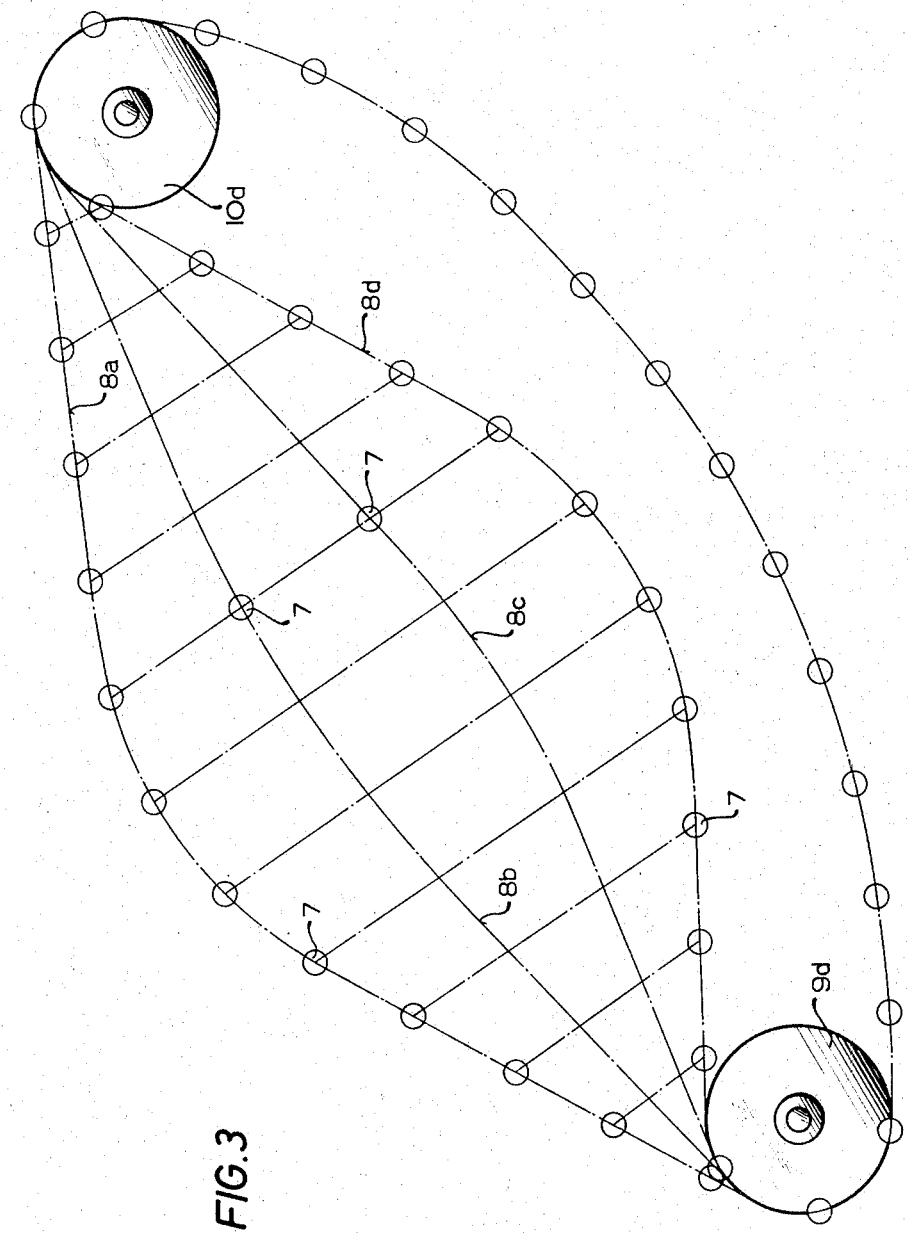

Jan. 16, 1968     H. PFEIFFER     3,363,743
METHOD AND APPARATUS FOR TRANSPORTING TUBULAR ARTICLES
Filed Aug. 24, 1964     6 Sheets-Sheet 6

INVENTOR
Hans PFEIFFER
By his ATTORNEY

United States Patent Office 3,363,743
Patented Jan. 16, 1968

3,363,743
METHOD AND APPARATUS FOR TRANSPORTING TUBULAR ARTICLES
Hans Pfeiffer, Solingen-Wald, Germany, assignor to Th. Kieserling & Albrecht, Solingen, Rhineland, Germany
Filed Aug. 24, 1964, Ser. No. 391,423
Claims priority, application Germany, Sept. 25, 1963, K 50,916
13 Claims. (Cl. 198—41)

The present invention relates to a method and apparatus for transporting tubular articles. More particularly, the invention relates to a method and apparatus for manipulating pipes and similar elongated articles while such articles are transported sideways, i.e., in directions at right angles or substantially at right angles to their axes.

It is well known that a modern plant for the production of seam-welded or seamless metallic pipe is capable of producing such articles at a very high rate of speed and, in many instances, the production rate could be increased still further provided that the work at the next-following stations can be carried out at the same high speed. In other words, it happens quite frequently that, while the pipes can be produced at a very high rate of speed, the welding or extruding apparatus must operate at less than full capacity because the apparatus and the devices which receive pipes from the welding or extruding station cannot process the pipes at the same high speed. Freshly formed seam-welded or seamless pipe is severed to yield sections of requisite length and such sections are thereupon engaged at their ends to undergo a test in order to detect the presence of eventual leaks. The test is carried out by filling the sections with a testing liquid and by sealing their ends while the liquid undergoes compression which is high enough to facilitate the detection of leaks. Modern testing devices are capable of testing at the same speed at which the pipe sections issue from the welding or rolling station; however, the devices at the next-following stations operate rather slowly and, furthermore, it is normally necessary to expel remnants of testing liquid before the successively delivered sections can undergo the next treatment. The liquid must be expelled for several reasons; for example, when the freshly tested sections are to be provided with internal and/or external threads, they are normally delivered to an inspecting station which includes a grate or a like support on which the sections rest in a horizontal plane while each thereof undergoes an inspection to determine the presence of flaws in appearance and/or material. The inspectors examine the inner sides and the outer sides of the sections, and any remnants of testing liquid would interfere with proper examination.

Heretofore, pipes or pipe sections coming from the testing station were normally stored for a sufficient length of time to insure full escape or evaporation of testing liquid. It was also proposed to provide nozzles which are inserted into one end of each consecutive pipe to expel the liquid through the other end. Such solutions are quite unsatisfactory, mainly because the storing station for freshly tested pipes occupies too much space and because compressed air is expensive.

Accordingly, it is an important object of the present invention to provide a novel method of expelling remnants of testing liquid at the same rate of speed at which the freshly tested tubular articles leave the testing station in a machine for the production of metallic pipes or the like.

It is also an object of the present invention to provide a method of the just outlined characteristics according to which the evacuation of any and all remnants of testing liquid takes place in a fully automatic way and while the pipes are on their way to the next processing station so that such evacuation of testing liquid does not in any way prolong the treatment of pipes.

A further object of the invention is to provide a method of automatically expelling testing water from seamless or seam-welded pipes and of simultaneously conveying the pipes from a testing station on to an inspecting station in such a way that the pipes reach the latter station in optimum position for immediate examination.

Another object of the invention is to provide a method of expelling a liquid from tubular articles in such a way that all traces of the liquid are expelled even if the pipes happen to be slightly bent or otherwise deformed.

A concomitant object of my invention is to provide a novel apparatus for the practice of my method and to construct the apparatus in such a way that the pipes are properly supported at all times to insure that the thus treated pipes are delivered to the next processing station in optimum position for additional treatment.

Still another object of the invention is to provide an apparatus of the just outlined characteristics which occupies little space, which can be readily installed in many existing machines for the production of tubular articles without necessitating substantial alterations in the construction and/or operation of such machines, whose operation is fully automatic so that it requires no attention once it is put to use, and which is capable of "dewaterizing" pipes and similar tubular articles at any desired rate of speed without incurring the risk that such treatment would result in damage to or misalignment of the articles.

An additional object of my invention is to provide a novel tilting conveyor which may be utilized in an apparatus of the above outlined character.

With the above objects in view, one feature of the present invention resides in the provision of a method of transporting metallic pipes and similar tubular articles between an inspecting station and a testing station at which a file of parallel horizontal articles is tested seriatim by the admission of a testing liquid into the interior of each consecutive article. The method comprises the steps of conveying at least some of the tested articles (i.e., at least all of the satisfactory articles) sideways from the testing station and toward the inspecting station, simultaneously tilting each consecutively conveyed article from its horizontal position through an angle sufficient to effect evacuation of any such testing liquid which might have remained in the articles leaving the testing station, thereupon returning the thus tilted articles seriatim back to their respective horizontal positions, and continuously advancing the articles in horizontal position on to the inspecting station.

In accordance with a preferred embodiment of my method, each consecutively conveyed article is tilted about its central portion (i.e., somewhere between its ends) so that one end rises to a higher level while the other end simultaneously descends to a lower level.

The novel features which are considered as characteristic of the invention are set forth in particular in the appended claims. The improved tilting apparatus itself, however, both as to its construction and its mode of operation, together with additional features and advantages thereof, will be best understood upon perusal of the following detailed description of a specific embodiment with reference to the accompanying drawings, in which:

FIGS. 1a and 1b are a fragmentary top plan view of a portion of a machine for the production of metallic pipes which embodies the tilting apparatus of my invention;

FIGS. 2a and 2b are a side elevational view of the structure shown in FIG. 1;

FIG. 3 is a schematic side elevational view of four endless flexible elements which are utilized for transporting the pipes through the tilting apparatus.

Figure 4:
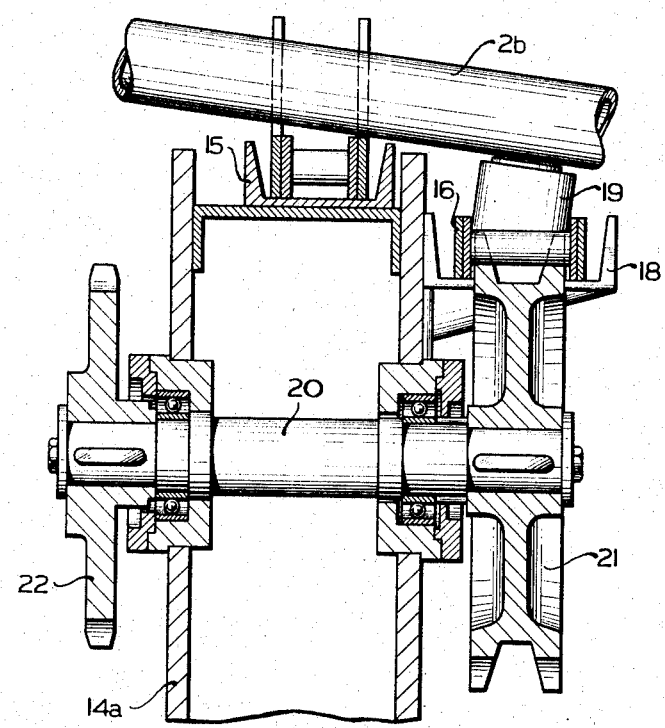
FIG. 4 is an enlarged fragmentary transverse section as seen in the direction of arrows from the line A–B of FIG. 2b.

Referring to FIGS 1a, 1b and 2a, 2b, there is shown a portion of a machine for producing, testing, tilting and inspecting elongated tubular articles of magnetizable material. In the present instance, the tubular articles are seam-welded or seamless metallic pipes 2 shown by phantom lines. The machine comprises a testing device which comprises a conveyor including a series of endless chains 1a which are trained around sprocket wheels 1 and are provided with jaws 1b cooperating with jaws 1c on the sprocket wheels 1 to advance a single file of parallel horizontal pipes 2 sideways, i.e., in directions substantially at right angles to their axes. The jaws 1c release the pipes automatically (see FIGS. 2a, 2b) when the pipes approach the lower stringers of the chains 1a so that such pipes descend consecutively onto rockable fingers 3 which constitute a transfer device and deliver the pipes to the tilting apparatus. While advancing with the conveyor 1–1c of the testing device, the pipes are tested in a manner known per se by compressed water or another testing liquid to determine the presence of eventual leaks, and whenever the testing device detects a defective pipe 2a, it sends a signal to fluid-operated cylinders 3a which rock the fingers 3 in a clockwise direction, as viewed in FIG. 2, to discharge such defective pipes into a travelling trough 5. Satisfactory pipes 2b are directed onto a bridge 4 which delivers them to consecutive motion transmitting members or dogs 7 provided on four endless chains 8a, 8b 8c, 8d of the tilting apparatus. The chains 8a–8d, their dogs 7, the sprocket wheels for the chains 8a–8d, and the drive mechanism for the sprocket wheels together constitute a tilting conveyor which delivers satisfactory pipes 2b on to a substantially horizontal inspecting grate 6. In the illustrated embodiment, the pipes 2b are tilted while moving from a lower level (bridge 4) to a higher level (grate 6), and the maximum inclination of pipes 2b on the upper stringers of the chains 8a–8d is sufficient to insure that any remnants of testing liquid will escape before the pipes reach the inspecting station.

The chains 8a–8d are trained around a set or group of lower deflecting members in the form of sprocket wheels 9a–9d and a set or group of upper deflecting members in the form of sprocket wheels 10a–10d. The hubs of adjoining sprocket wheels in each group are connected to each other by articulately mounted shafts 11, and the hub of the sprocket wheel 9a is driven by a similarly mounted shaft 12 which is coupled to the output shaft of a variable-speed transmission 13. This transmission is preferably driven by an electric motor (not shown) which also drives the sprocket wheels 1 in the testing device. The axes of the sprocket wheels 9a–9d and 10a–10d are horizontal and parallel to each other.

The upper stringers of the chains 8a–8d are guided by upright supports 14a–14d which are provided with channel-shaped guides 15 (see FIG. 4). It will be noted that the chains 8a–8d are located in four parallel vertical planes.

The tilting apparatus further comprises a retaining unit which serves to prevent axial or other movements of the pipes 2b (with reference to the chains 8a–8d) while the pipes advance along at least a portion of their path from the bridge 4 on to the grate 6. This retaining unit comprises two endless chains 16, 17 whose upper stringers are respectively adjacent to the upper stringers of the chains, 8a, 8b and are led over guides 18 provided on the supports 14a, 14b, see also FIG. 4. The links of the chains 16, 17 carry permanent magnets 19 which attract the pipes 2b and prevent shifting or overturning of such pipes during tilting.

The support 14a carries a horizontal shaft 20 for one of the sprocket wheels 21 for the chain 16. This shaft 20 is connected with a sprocket wheel 22 (see also FIG. 4) for a driving chain 23. The chain 23 is trained around the sprocket wheel 22 and around a further sprocket wheel 24 on the hub 25 of the sprocket wheel 9a. Thus, the shaft 12 drives the sprocket wheels 9a, 24 at the same speed so that the magnets 19 on the chain 16 advance at the speed of the dogs 7. The driving connection from the chain 16 to the chain 17 comprises a shaft 26 whose ends are articulately connected to the shaft 20 and to the shaft 27 for a sprocket wheel 28 which engages the chain 17. As a rule, it suffices to engage each pipe 2b at two spaced points but, if the pipes are quite heavy and if the chains 8a–8d are driven at a very high speed, the retaining unit of the tilting apparatus may comprise one or more additional chains with magnets 19 so that the pipes 2b will be attracted at three or more points.

The distribution of the guides 15 on the supports 14a–14d is such that the median portion of the upper stringer of the chain 8d is well below the upper stringer of the chain 8a, see FIG. 3, and that the upper stringers of the intermediate chains 8b, 8c are respectively curved upwardly and downwardly from a straight line which is tangential to the sprocket wheels 9d, 10d. Consequently, the rows of transversely aligned dogs 7 will cause one end of each consecutive pipe 2b to descend and the other end to rise while the pipes advance along the first half of the path defined by the upper stringers of the chains 8a–8d. In the second portion of this path, the movement of the pipe ends is reversed and, at the time they reach the sprocket wheels 10a–10d; the pipes 2b return to horizontal positions and are ready to roll onto the grate 6. FIG. 3 shows that the dogs 7 on the upper stringers of the chains 8b, 8c are disposed on straight lines connecting the corresponding dogs 7 on the upper stringers of the chains 8a, 8d. It can be said that the upper stringers of the chains 8a, 8b are mirror symmetrical to the upper stringers of chains 8c, 8d.

A very important advantage of the retaining suit which includes the chains 16, 17, their sprocket wheels, the drive mechanism for the sprocket wheels, and the magnets 19 is that the pipes 2b are not positively clamped at the time they approach the upper sprocket wheels 10a–10d. Thus, merely by providing a retaining unit which is not integrally connected with the chains 8a–8d, I insure that there is no need for stripping devices or like separating elements which would be needed if the magnets 19 were provided on the links of the chains 8a–8d. However, it is to be noted that the tilting conveyor may be combined with or that this tilting conveyor may cooperate with other types of retaining units, for example, with claws or jaws analogous to the jaws 1b, 1c shown in FIG. 2 or that the tilting apparatus may be provided with side walls to prevent axial displacements of the pipes.

The machine of my invention operates as follows:

The pipes 2 which travel with the conveyor 1–1c of the testing device are tested by a liquid which has been admitted under pressure into the interior of each consecutive pipe while the ends of the pipes are sealed. All defective pipes 2a are conveyed into the trough 5, and the remaining pipes 2b travel over the bridge 4 to be entrained by the momentarily aligned dogs 7. While travelling around the lower end turn of the tilting conveyor, i.e., around the sprocket wheels 9a–9d, the dogs 7 form parallel horizontal rows so that each pipe 2b is engaged and begins to travel upwardly while its axis remains in a horizontal plane. However, as the pipes 2b begin to advance with the lower halves of the upper stringers of the chains 8a–8d, one end of each consecutive pipe begins to descend to a lower level and the other end begins to rise to a higher level so that the pipes are tilted in vertical planes which are normal to the direction of advance whereby each pipe is tilted about its central portion. In the second half of their path of movement toward the upper sprocket wheels 10a–10b, the pipes 2b are tilted in the opposite direction so that they return into horizontal planes and may travel around the sprocket wheels 10a–10b and on to the grate 6. FIG. 4 shows that the heads of the magnets 19 are inclined with reference to a horizontal plane so that they may attract the adjacent portions of pipes 2b with a greater force. As illustrated in FIGS. 1 and 2, the upper stringers of the chains 16, 17 need not be as long as the upper stringers of the chains 8a, 8b. All that counts is to provide magnets or analogous retaining means along that portion of the path between the sprocket wheels 9a–9d and 10a–10d in which the inclination of the pipes with reference to a horizontal plane is sufficient to eventually result in axial displacement of the pipes. In other words, wherever the friction between the pipes and the dogs 7 suffices to prevent axial movements of the pipes, the pipes will be supported solely by the dogs, and FIGS. 2a, 2b show that the stringers of the chains 16, 17 are adjacent to the median portions of the upper stringers of the chains 8a, 8b where the inclination of the pipes 2b is greatest.

Any traces of testing liquid which might have remained in the pipes 2b are discharged in a fully automatic way while the pipes advance along the upper stringers of the chains 8a–8d so that each pipe is ready for inspection as soon as it reaches the grate 6. The inspectors standing next to the grate 6 examine the pipes to detect the presence of deficiencies in shape, material and/or other characteristics of the articles.

It is to be noted that the improved machine may be modified in a number of ways without departing from the spirit of my invention. For example, the parts 3, 3a, 4, 5 may be omitted so that the conveyor 1–1c of the testing device will discharge pipes seriatim directly onto the rows of horizontally aligned dogs 7. Also, the testing device may discharge pipes onto the bridge 4, and, if desired, the testing device may be replaced by one which tests the pipes on the chains 8a–8d so that the grate 6 may be preceded by an ejecting device similar to the one including the parts 3, 3a and 5. Moreover, the conveyor of the tilting apparatus may comprise not only two or three but also five or more chains. The chains and the sprocket wheels may be replaced by pulleys and belts or analogous endless flexible elements. Also, it often suffices if only one end of each satisfactory pipe is tilted, i.e., the pipes may be tilted about one of their ends, not about the central portions thereof.

Finally, it is to be mentioned that the tilting apparatus of my invention is equally useful in other types of machines in which elongated rod-shaped or tubular articles must be tilted back and forth or in a single sense while advancing in a direction which is perpendicular or nearly perpendicular to their axes.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A method of transporting metallic pipes and similar tubular articles between an inspecting station and a testing station at which a file of parallel horizontal articles is tested seriatim by admission of a testing liquid into each consecutive article, comprising the steps of conveying at least some of the tested articles sideways from the testing station and toward the inspecting station; simultaneously tilting each consecutively conveyed article from the horizontal position through an angle sufficient to effect evacuation of any such testing liquid which might have remained in the articles on leaving the testing station; thereupon returning the thus tilted articles seriatim back to their respective horizontal positions; and continuously advancing the articles in horizontal position on to the inspecting station.

2. A method as set forth in claim 1, wherein each consecutively conveyed article is tilted about the central portion thereof so that one of its ends rises to a higher level while the other end simultaneously descends to a lower level.

3. A method of transporting elongated metallic pipes and the like from a first station to a second station; comprising the steps of conveying a file of parallel horizontal articles seriatim through the first station in a direction which is perpendicular to the axes of such articles and simultaneously maintaining the articles in horizontal position; conveying the articles seriatim from the first station toward the second station by moving the articles in a direction which is perpendicular to their axes; simultaneously tilting the articles seriatim in a first direction from their respective horizontal positions and thereupon tilting the articles seriatim back to their respective horizontal positions; and delivering the twice-tilted articles to the second station.

4. An apparatus for tilting pipes and similar elongated tubular articles, comprising a conveyor including a pair of endless flexible elements disposed in parallel vertical planes and having upper and lower stringers, first and second deflecting members provided at the ends of said stringers and rotatable about parallel horizontal axes, drive means for driving at least some of said deflecting members so as to advance said upper stringers in a direction from said first deflecting members toward said second deflecting members, guide means provided intermediate said first and second deflecting members and engaging said upper stringers so as to maintain a median portion of one upper stringer at a level above the corresponding portion of the other upper stringer, and motion transmitting elements provided on said flexible elements in such distribution that each motion transmitting element on one of said flexible elements is aligned transversely with a motion transmitting element on the other flexible element whereby the articles which are fed into the path of such motion transmitting elements adjacent to said first deflecting members are tilted from horizontal positions while the corresponding motion transmitting elements advance with the median portions of said upper stringers and the articles return to horizontal positions at the time they reach said second deflecting members; and retaining means for holding the articles against movement with reference to the corresponding motion transmitting elements during tilting said retaining members automatically initiating holding of said elongated tubular articles latest at the moment when the same start to be tilted from their horizontal positions and automatically releasing said elongated tubular articles after said elongated tubular articles have returned to their horizontal positions.

5. An apparatus for tilting metallic pipes and similar elongated tubular articles of magnetizable material, comprising a conveyor including a pair of endless flexible elements disposed in parallel vertical planes and having upper and lower stringers, first and second deflecting members provided at the ends of said stringers and rotatable about parallel horizontal axes, drive means for driving at least some of said deflecting members so as to advance said upper stringers in a direction from said first deflecting members toward said second deflecting members, guide means provided intermediate said first and second deflecting members and engaging said upper stringers so as to maintain a median portion of one upper stringer at a level above the corresponding portion of the other upper stringer, and motion transmitting elements provided on said flexible elements in such distribution that each motion transmitting element on one of said flexible elements is aligned transversely with a motion transmitting element on the other flexible element whereby the articles which are fed into the path of such motion transmitting elements adjacent to said first deflecting members are tilted from horizontal positions while the corresponding motion transmitting elements advance with the median portions of said upper stringers and the articles return to horizontal positions at the time they reach said second deflecting members; and retaining means for holding the articles against movement with reference to the corresponding motion transmitting elements during tilting, said retaining means comprising additional endless flexible elements having upper stringers adjacent to the median portions of said first mentioned upper stringers, means for driving said additional flexible elements so that their upper stringers advance at the same speed and in the same direction as said first mentioned upper stringers, and permanent magnets provided on said additional flexible elements to attract the articles during tilting.

6. An apparatus as set forth in claim 5, wherein said magnets have inclined faces to provide for stronger attraction of articles during tilting.

7. An apparatus as set forth in claim 5, wherein said flexible elements are chains and wherein said deflecting members are sprocket wheels.

8. An apparatus for tilting pipes and similar elongated tubular articles, comprising a conveyor including a pair of endless flexible elements disposed in parallel vertical planes and having upper and lower stringers, first and second deflecting members provided at the ends of said stringers and rotatable about parallel horizontal axes, drive means for driving at least some of said deflecting members so as to advance said upper stringers in a direction from said first deflecting members toward said second deflecting members, guide means provided intermediate said first and second deflecting members and engaging said upper stringers so as to maintain a median portion of one upper stringer at a level above the corresponding portion of the other upper stringer, and motion transmitting elements provided on said flexible elements in such distribution that each motion transmitting element on one of said flexible elements is aligned transversely with a motion transmitting element on the other flexible element whereby the articles which are fed into the path of such motion transmitting elements adjacent to said first deflecting members are tilted from horizontal positions while the corresponding motion transmitting elements advance with the median portions of said upper stringers and the articles return to horizontal positions at the time they reach said second deflecting members; retaining means for holding the articles against movement with reference to the corresponding motion transmitting elements during tilting said retaining members automatically initiating holding of said elongated tubular articles latest at the moment when the same start to be tilted from their horizontal positions and automatically releasing said elongated tubular articles after said elongated tubular articles have returned to their horizontal positions; and means for delivering articles in horizontal position into the path of motion transmitting elements adjacent to said first deflecting members.

9. An apparatus for tilting pipes and similar elongated tubular articles, comprising a conveyor including a pair of endless flexible elements disposed in parallel vertical planes and having upper and lower stringers, first and second deflecting members provided at the ends of said stringers and rotatable about parallel horizontal axes, drive means for driving at least some of said deflecting members so as to advance said upper stringers in a direction from said first deflecting members toward said second deflecting members, guide means provided intermediate said first and second deflecting members and engaging said upper stringers so as to maintain a median portion of one upper stringer at a level above a straight line which is tangential to said first and second deflecting members and to simultaneously maintain the median portion of the other upper stringer below said line, and motion transmitting elements provided on said flexible elements in such distribution that each motion transmitting element on one of said flexible elements is aligned transversely with a motion transmitting element on the other flexible element whereby the articles which are fed into the path of such motion transmitting elements adjacent to said first deflecting members are tilted from horizontal positions while the corresponding motion transmitting elements advance with the median portions of said upper stringers and the articles return to horizontal positions at the time they reach said second deflecting members; and retaining means for holding the articles against movement with reference to the corresponding motion transmitting elements during tilting said retaining members automatically initiating holding of said elongated tubular articles latest at the moment when the same start to be tilted from their horizontal positions and automatically releasing said elongated tubular articles after said elongated tubular articles have returned to their horizontal positions.

10. An apparatus as set forth in claim 9, further comprising additional endless flexible elements provided with motion transmitting elements and disposed in parallel vertical planes intermediate said first mentioned flexible elements, said additional flexible elements being trained around said deflecting members and having upper stringers which are deformed by said guide means in such a way that their motion transmitting elements are located on straight lines connecting the corresponding motion transmitting elements on said first mentioned upper stringers.

11. A conveyor as set forth in claim 10, wherein said upper stringers are mirror symmetrical to each other and wherein said flexible elements are link chains.

12. A conveyor as set forth in claim 11, wherein said deflecting members are sprocket wheels having hubs and wherein said drive means comprises shafts having ends articulately connected with the sprocket wheels in said first and second sets.

13. A conveyor as set forth in claim 9, wherein said second set of deflecting members is located at a level above said first set so that the articles are conveyed upwardly, and further comprising a horizontal grate adjacent to said second set of deflecting members to receive the articles seriatim from said upper stringers.

References Cited

UNITED STATES PATENTS

| | | |
|---|---|---|
| 2,706,991 | 4/1955 | Pettit. |
| 3,169,631 | 2/1965 | Knappe. |

FOREIGN PATENTS

| | | |
|---|---|---|
| 401,621 | 11/1933 | Great Britain. |

RICHARD E. AEGERTER, *Primary Examiner.*